June 2, 1931. J. A. LEE 1,808,667
WOOD BLOCK
Filed Oct. 4, 1930
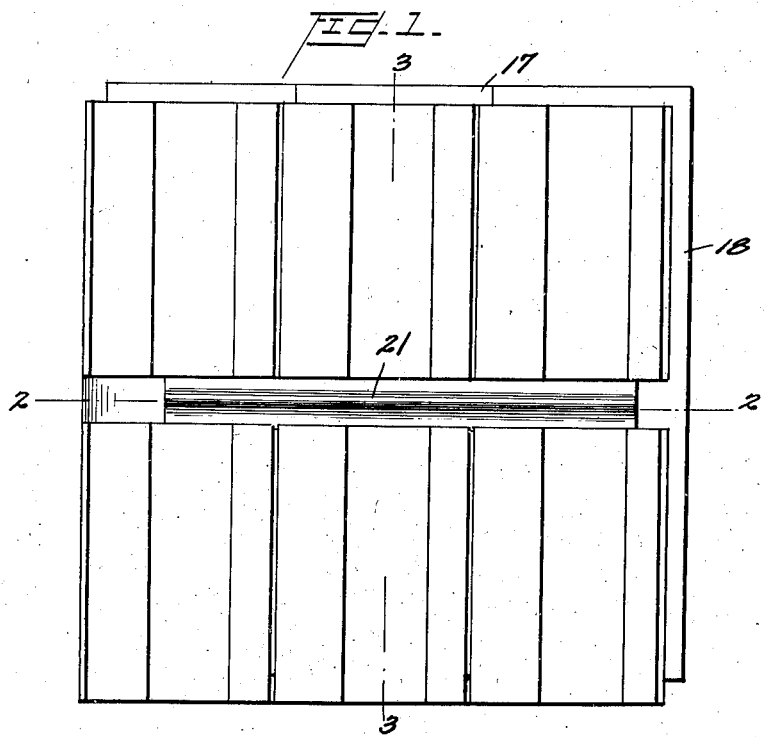
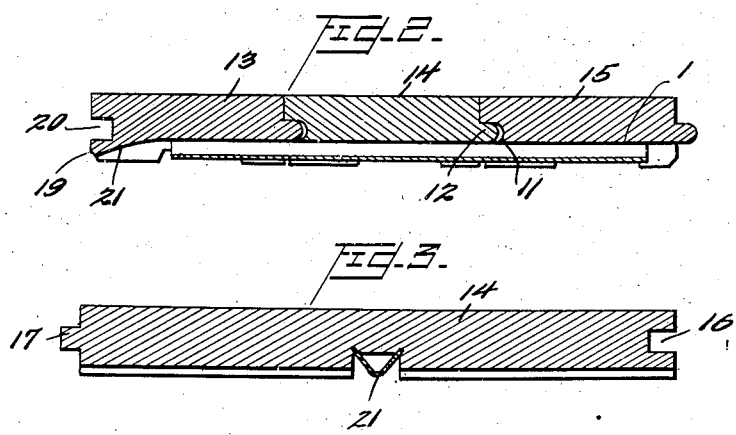
Inventor
John A. Lee,
By John Boyle Jr.
Attorney Patented June 2, 1931

1,808,667

UNITED STATES PATENT OFFICE

JOHN A. LEE, OF MEMPHIS, TENNESSEE, ASSIGNOR TO E. L. BRUCE COMPANY, OF MEMPHIS, TENNESSEE, A CORPORATION OF DELAWARE

WOOD BLOCK

Application filed October 4, 1930. Serial No. 486,458.

My invention relates to wood block flooring and one of the objects is to fabricate a wood block from a plurality of strips, that will retain its shape and that can be manufactured cheaply.

In the application of C. W. Allen, Serial Number 351,435 filed March 30, 1929, there is disclosed a wood block made from short pieces of flooring securely bound together by a metal tie fitting in registering grooves in the underside of the strips. In cutting this groove in the underside of the strips the depth of the groove is such that it cuts in two the under lip of the longitudinal groove on the edge of the block, thereby weakening and causing breakage of this lower lip.

One of the objects is to so cut the groove in the underside of the block that it will not cut through the lower lip of the longitudinal groove on the edge of the block.

Referring to the drawings for a more complete disclosure of the invention,

Fig. 1 is a bottom plan view of a block,

Fig. 2 is a section on the line 2—2 of Fig. 1, and

Fig. 3 is a section on the line 3—3 of Fig. 1.

Flooring strips as customarily made have a groove 11 along one edge and a tongue 12 along the opposite edge. The flooring strips 13, 14 and 15 are first cut to the same length and then passed through a machine that simultaneously cuts a groove 16 in one end and a tongue 17 on the other end, across the grain, and a groove 18 in the back of the strip. The tongue and grooves may be cut by rotary cutter heads operating on each end and in the center of the strip simultaneously.

Heretofore the groove 18 has been cut across the backs of all the strips to a uniform depth. This resulted in cutting in two the lower lip 19 of the groove 20, thereby weakening it and causing excessive breakage of the lower lip.

In order to avoid this breakage of the lower lip, the groove 18 is shallower at the point 21 where it cuts into the lower lip 19 thereby making a much stronger lower lip.

The several pieces of wood 13, 14 and 15, having been sawed to the desired length and tongued and grooved at the ends and grooved on the underside, are pressed together and the metal tie 21, made of cold rolled steel, is flattened out to bring its edges into sufficiently tight contact with the sides of the groove 18 so as to hold the strips rigidly in assembled relationship.

In the smaller sizes of blocks, a single tie and groove on the underside will be sufficient but with the larger sizes more than one tie and groove may be used.

I claim:

1. A block comprising a plurality of strips of wood, having a transverse groove in its underside, a fastening device in the said groove, a longitudinal groove along the edge of the block at right angles to the transverse groove, the transverse groove being relatively shallow adjacent the underside of the longitudinal groove to avoid weakening the under lip of the longitudinal groove.

2. A block having a transverse groove in its underside, a longitudinal groove along the edge of the block, the transverse groove being relatively shallow adjacent the underside of the longitudinal groove to avoid weakening the under lip of the longitudinal groove.

In testimony whereof I affix my signature.

JOHN A. LEE.